United States Patent Office 3,535,127
Patented Oct. 20, 1970

3,535,127
PROCESS OF MAKING DEHYDRATED APPLESAUCE
Abdul R. Rahman, Natick, and Thomas R. Schmidt, Holliston, Mass., assignors to the United States of America as represented by the Secretary of the Army
No Drawing. Filed May 25, 1967, Ser. No. 642,671
Int. Cl. A23b 7/02
U.S. Cl. 99—204                                       8 Claims

ABSTRACT OF THE DISCLOSURE

Make a readily rehydratable, non-caking, storage-stable, dehydrated applesauce by removing a substantial portion of the juice of the apples by pressing prior to dehydration thereof.

---

The invention described herein may be manufactured, used, and licensed by or for the Government for governmental purposes without the payment to us of any royalty thereon.

This invention relates to a method of producing a dehydrated applesauce product which is readily rehydratable, is storage stable and does not cake during storage at elevated temperatures, and to the dehydrated applesauce product produced thereby.

Dehydrated applesauce powder is a very desirable component of field rations for the Armed Forces and of rations for astronauts because of the generally widespread acceptabiltiy of applesauce. However, one serious drawback has militated against incorporating dehydrated applesauce powder in such field and space rations, namely its tendency to lump and cake, particularly as the result of storage of dehydrated applesauce in flexible packages under vacuum at relatively high temperatures, such as 100° F. or higher. In military operations such temperatures are frequently encountered. Hence, any food ration must be stable under such conditions in order to merit serious consideration as a component of field rations.

It is an object of the present invention to provide a method of making dehydrated applesauce powder which will overcome the above-discussed deficiency in dehydrated applesauce powder.

It is another object of the present invention to provide an improved dehydrated applesauce powder which will be storage-stable without caking or lump formation at elevated temperatures and will be instantly rehydratable to an applesauce having the appearance, texture and flavor of freshly prepared applesauce.

Other objects and advantages will appear from the following description of the invention, and the novel features will be particularly pointed out in connection with the apppended claims.

The dehydrated applesauce product of the present invention is made resistant to caking by removing a substantial proportion of the juice of the apple prior to dehydration thereof. Any loss in flavor and sweetness resulting from the removal of the juice is overcome by adding malic acid and a non-reducing sugar, such as sucrose, to the dehydrated applesauce powder at the time of packaging. If all, or substantially all, of the juice is removed, satisfactory flavor may be restored by packaging the dehydrated applesauce powder with a non-reducing sugar and apple essence, possibility augmented by malic acid.

While we do not wish to be bound by any theory as to the underlying cause of the caking of dehydrated applesauce powder produced by the conventional procedures, it is believed that an important contributory factor in connection with this problem is the existence of reducing sugars in apples. Thus, it is believed that the removal of substantial quantities of the juice from the apple prior to dehydration effectively prevents caking because of the removal of substantial quantities of the reducing sugars present in the apples. The loss of sweetness and flavor of the applesauce are compensated for by the addition of non-reducing sugar and various flavor components normally present in apples, particularly malic acid.

We have found that not less than 40 percent by weight of the apple pieces must be pressed out as juice prior to dehydration thereof in order to avoid caking of the final product when stored at temperatures of 100° F. or higher, especially when the final product is packaged in flexible containers under vacuum. We prefer to remove 45 to 55 percent of the juice based on the weight of the apple pieces since the dehydrated applesauce product produced thereby retains a substantial amount of the normally present flavoring ingredients while it does not retain too much of the ingredients which tend to cause caking of the dehydrated powder at temperatures and times of storage experienced in the normal usage of this type of product by the Armed Forces.

As has been pointed out above, removal of substantial portions of the juice of the apple prior to dehydration results in a dehydrated applesauce product of reduced flavor and sweetness. To compensate for this, we add enough malic acid or other apple flavoring agents, such as apple essence or artificial flavoring, and enough granulated or powdered sucrose or other non-reducing sugar to the dehydrated applesauce powder. The proportion of malic acid or other flavoring ingredient added and also the proportion of sucrose or other non-reducing type sugar added will depend to a considerable degree on the variety of apple being used, its growing conditions and the degree of maturity at the time of processing, as well as the degree of extraction of the juice during processing. In general, we add from about 0.5 to about 3.0 percent malic acid and from about 100 to about 200 percent of sucrose or other non-reducing sugar, these proportions being based on the weight of the dehydrated applesauce powder. It is our practice to add these ingredients to the package at the time of hermetic packaging of the dehydrated applesauce powder, but they may be added during reconstitution of the applesauce or at other suitable times following dehydration of the apple pieces. These ingredients do not require thorough mixing with the applesauce powder at the time of packaging since they will normally be stirred into the rehydrated applesauce during reconstitution thereof immediately prior to eating the reconstituted applesauce.

We have found it desirable to dehydrate the apple pieces, after the removal of a portion of the juice therefrom, to a final moisture content of not more than about 3 percent by weight. For long-term storage purposes we prefer to reduce the moisture to not more than about 2 percent by weight by freeze-vacuum-dehydration of the pressed apple pieces.

The dehydrated applesauce powder is packaged in hermetically sealed flexible containers or cans which are impermeable to moisture and oxygen. It is preferred to package the applesauce powder in the absence of atmospheric oxygen (under an inert gas, such as nitrogen or carbon dioxide, or under vacuum) to minimize oxidative changes in the applesauce powder product during storage and shipment. When removed from the hermetically sealed flexible containers or cans, the product can be quickly rehydrated by mixing it with cold water in a suitable amount, whereupon a reconstituted applesauce having the appearance and texture of freshly prepared applesauce is obtained. When sucrose and malic acid or other flavoring agents, such as apple essence or artificial flavoring agents having substantially the flavor characteristics of apples, are added in suitable proportions to the dehydrated applesauce power either during packaging or during reconstitution, the reconstituted applesauce has substantially the flavor of freshly prepared applesauce.

Having described the general conditions under which the invention may be practiced, we will now disclose an example of the production of a freeze-vacuum-dehydrated applesauce powder product in accordance with this invention. It will be understood, of course, that the above-enumerated and other objects of our invention may also be accomplished by varying the amount of juice extracted and by varying the proportions of sucrose or other non-reducing sugars and of malic acid or other flavoring agents added to the freeze-dehydrated applesauce powder during packaging thereof, and by other suitable variations of the detailed method steps, about to be set forth below, which are intended to be for illustrative purposes and not for the purpose of limiting the scope of our invention.

EXAMPLE

Fresh, mature, but not overripe, McIntosh apples of good grade are washed, peeled, cored and diced to form cubes approximately ⅜-inch on each side. The diced pieces are immediately blanched in water at 212° F. for 2 to 5 minutes, then sulfited with a bath of aqueous solution containing approximately 750 p.p.m. of sodium acid sulfite (sodium metabisulfite). The excess sodium acid sulfite solution is drained off of the apple dice, which are then pressed until approximately 50 percent of the weight of the thoroughly drained dice is removed as juice. The remaining pressed apple solids are then frozen, placed in a freeze-vacuum-dehydrator and freeze-vacuum-dehydrated at an absolute pressure not exceeding about 1.0 millimeter of mercury until the moisture content of the apple solids is reduced to about 1 percent on a weight basis. The dehydrated apple solids are mechanically ground so that 100 percent thereof will pass through a U.S. Standard No. 10 sieve. The resulting freeze-dehydrated ground applesauce powder is loaded into flexible laminated film envelopes comprising a sandwich of polyethylene terephthalate ("Mylar") film on the outside, polyethylene film on the inside, and aluminum foil between the polyethylene terephthalate and the polyethylene films. Into each envelope is loaded an individual serving of 15 grams of the freeze-dehydrated applesauce powder. Also 0.2 gram of malic acid granules and 20 grams of granulated sucrose are loaded into each envelope. The envelopes containing the individual servings of dehydrated applesauce are subjected to vacuum until substantially all of the oxygen has been removed from the contents of the envelopes. The envelopes are then heat sealed while retaining the substantially oxygen-free atmosphere. The envelopes of freeze-dehydraated applesauce powder are stored at 100° F. for two weeks and found to be free of caking; whereas similarly prepared freeze-dehydrated applesauce powder, but omitting the removal of a substantial portion of the juice, caked badly as the result of storage under the same conditions.

In the use of the freeze-dehydrated applesauce powder prepared in accordance with the above example, an envelope is opened and the contents are poured into a dish or pan. Seven ounces of cold water are added and thoroughly mixed with the contents of the envelope. The resulting reconstituted applesauce has appearance, texture, and flavor characteristics substantially equivalent to freshly prepared applesauce.

Although the invention has been described in connection with the use of McIntosh apples, which are preferred, it is applicable to Cortland, Yellow Delicious, Red Delicious, or any other variety of apple with adjustments of the conditions which will be within the skill of a person of ordinary skill in the art.

While the step of blanching to inactivate the enzymes present in the apple pieces has been described above in terms of treatment of the apple pieces with water at 212° F. for from 2 to 5 minutes, it is possible to accomplish this objective under other conditions. In general, water of at least 200° F. will be applied to the apple pieces for from 2 to 8 minutes, the time required being inversely proportional to the temperature. Alternatively, steam at 212° F. or higher may be applied for this purpose, the steam treatment being applied for 6 minutes or more at atmospheric pressure or for shorter times at higher pressures than atmospheric pressure.

Sulfiting of the apple pieces may be carried out before blanching, if desired. Other edible sulfites or sources of sulfurous acid may be used for sulfiting the apple pieces, including sodium sulfite, potassium sulfite, potassium metabisulfite, calcium sulfite, sulfurous acid, and liquid sulfur dioxide. Sufficient edible sulfite or bisulfite should be applied to the apple pieces to obtain a dehydrated applesauce powder product having a sulfite content of about 350±150 parts per million calculated as sulfur dioxide.

Although we prefer to freeze-vacuum-dehydrate our pressed apple solids, other methods of dehydration may be employed, provided that the conditions employed do not produce excessive amounts of off-flavors such that the addition of malic acid, apple essence, and other flavoring agents during packaging or reconstitution would fail to overcome such off-flavors. Air-drying, drum-drying under relatively mild conditions, spray drying or vacuum drying without freezing may be employed to produce a dehydrated applesauce suitable for the general public.

Other variations in the process steps are possible. However, the essential feature of our process is the removal of enough of the juice of the apple prior to dehydration to prevent subsequent caking of the dehydrated applesauce powder at elevated temperatures.

The present invention solves a problem which has plagued manufacturers of dehydrated applesauce and which, until now, has rendered virtually impossible the inclusion of dehydrated applesauce in flexibly packaged rations for the Armed Forces as well as in rations for space exploration. Caking of applesauce powder makes it very difficult to reconstitute and defeats the purpose of providing rapidly rehydratable foods which very closely approximate the freshly prepared foods.

It will be understood, of course, that the foregoing example of the practice of our invention is for illustrative purposes and that the detailed instructions as to proportitoning of ingredients as well as the sequence of steps in the process may be varied within the skill of the expert in the art of food technology. These and other variations which will readily occur to the expert are thus included within the spirit and scope of our invention and subjoined claims.

We claim:
1. In a process for producing a dehydaated applesauce product, the steps comprising, sulfiting apple pieces with an edible material selected from the group consisting of alkali sulfites, alkali bisulfites, alkaline earth sulfites, sulfurous acid, and sulfur dioxide, blanching the apple pieces in water at a temperature not less than about 200° F., removing not less than about 40 percent by weight of the apple pieces as juice by pressing said apple pieces, and dehydrating the apple pieces to a moisture content of not more than about 3 percent by weight, whereby an instantly rehydratable, storage-stable, non-caking applesauce product is obtained which upon rehydration has the appearance and texture of freshly prepared applesauce.

2. Process according to claim 1 wherein said treated and blanched apple pieces are pressed sufficiently to remove from about 45 percent to about 55 percent by weight of the apple pieces as juice and the pressed apple pieces are freeze-vacuum-dehydrated to a moisture content of not more than about 2 percent by weight.

3. Process according to claim 1 wherein said dehydrated apple pieces are ground to form a dehydrated applesauce powder capable of passing through a U.S. Standard No. 10 sieve.

4. Process according to claim 3 wherein artificial flavoring material is added to said ground dehydrated applesauce powder in an amount sufficient to impart the flavor of freshly prepared applesauce to said ground dehydrated applesauce upon rehydration.

5. Process according to claim 3 wherein from about 0.5 to about 3.0 percent malic acid on a weight basis is added to said ground dehydrated applesauce powder.

6. Process according to claim 3 wherein from about 100 to about 200 weight percent based on the weight of said ground dehydrated applesauce powder of a non-reducing type sugar is added to said ground dehydrated applesauce powder.

7. Process according to claim 3 wherein from about 0.5 to about 3.0 percent malic acid and from about 100 to about 200 percent sucrose, on a weight basis, are added to ground dehydrated applesauce powder.

8. Process according to claim 2 wherein said freeze-vacuum-dehydrated apple pieces are ground to form a dehydrated applesauce powder capable of passing through a U.S. Standard No. 10 sieve.

References Cited

UNITED STATES PATENTS 3,060,037 10/1962 Dorsey _____ 99—204
3,235,391 2/1966 Dorsey.

OTHER REFERENCES

Lazar et al., Food Technology, volume 20, No. 4, April 1966, pp. 179–181.

A. LOUIS MONACELL, Primary Examiner

R. B. ANDEWELT, Assistant Examiner